US011204217B2

(12) United States Patent
Koutsogiorgos

(10) Patent No.: US 11,204,217 B2
(45) Date of Patent: Dec. 21, 2021

(54) SPEARGUN HANDLE

(71) Applicant: Petros Koutsogiorgos, Nea Ionia Volos (GR)

(72) Inventor: Petros Koutsogiorgos, Nea Ionia Volos (GR)

( * ) Notice: Subject to any disclaimer, the term of this patent is extended or adjusted under 35 U.S.C. 154(b) by 0 days.

(21) Appl. No.: 16/964,921

(22) PCT Filed: Jan. 15, 2019

(86) PCT No.: PCT/GR2019/000003
§ 371 (c)(1),
(2) Date: Jul. 24, 2020

(87) PCT Pub. No.: WO2019/158957
PCT Pub. Date: Aug. 22, 2019

(65) Prior Publication Data
US 2021/0041204 A1    Feb. 11, 2021

(30) Foreign Application Priority Data
Feb. 15, 2018  (GR) ............................... 20180100055

(51) Int. Cl.
*F41B 7/04*      (2006.01)
*A01K 81/06*     (2006.01)
*A01K 81/04*     (2006.01)
*A01K 81/00*     (2006.01)

(52) U.S. Cl.
CPC ................ *F41B 7/046* (2013.01); *F41B 7/04* (2013.01); *A01K 81/00* (2013.01); *A01K 81/04* (2013.01); *A01K 81/06* (2013.01)

(58) Field of Classification Search
CPC .. F41B 7/04; F41B 7/046; F41B 7/043; F41B 7/00; F41B 7/003; A01K 81/00; A01K 81/04; A01K 81/06
See application file for complete search history.

(56) References Cited

U.S. PATENT DOCUMENTS

| 3,364,609 A | * | 1/1968 | Kennedy | F41B 7/04 43/6 |
| 4,056,859 A | * | 11/1977 | Pace | F41B 7/003 7/107 |
| 4,318,389 A | * | 3/1982 | Kiss, Jr. | A01K 81/00 124/22 |
| 4,359,999 A | * | 11/1982 | Garofalo | F41B 7/04 124/22 |

(Continued)

FOREIGN PATENT DOCUMENTS

| FR | 2537262 | * | 6/1984 | ........... F41B 7/04 |
| FR | 2960957 | * | 12/2011 | ........... F41B 7/04 |

*Primary Examiner* — John E Simms, Jr.

(57) ABSTRACT

The invention relates to a speargun handle (1) having a reinforced trigger guard (5) which creates a chamber (6) in which there is a trigger lever (7). The handle (1) has a retaining member (10) with chambers (12) surrounded by a non-slip retaining cover (11). It also has a loading aid (17), a front end (23) for fitting a tube (2), incorporated deflectors (25) for lines and a line holder (32). The handle (1) further comprises a reverse trigger mechanism, wherein the trigger lever (7) is located outside the cartridge (26). The retaining hook (27) may alternatively have a notch for a pivot pin (38) which receives the developing stresses derived from the shaft's (4) launching.

5 Claims, 16 Drawing Sheets

(56) References Cited

U.S. PATENT DOCUMENTS

| | | | | |
|---|---|---|---|---|
| 4,466,417 A * | 8/1984 | Mulot | ............... | F42B 12/68 |
| | | | | 124/25 |
| 8,387,602 B1 * | 3/2013 | Bruington | ............ | A01K 81/00 |
| | | | | 124/20.3 |
| 2002/0026741 A1 * | 3/2002 | Aguilar | ............ | F41B 11/83 |
| | | | | 42/146 |
| 2007/0163558 A1 * | 7/2007 | Riffe | ............ | F41B 7/043 |
| | | | | 124/22 |
| 2008/0017181 A1 * | 1/2008 | Pedemonte | ............ | A01K 81/00 |
| | | | | 124/80 |
| 2009/0038600 A1 * | 2/2009 | Robinik | ............ | F41B 7/04 |
| | | | | 124/22 |
| 2015/0136103 A1 * | 5/2015 | Thornbrough | ............ | F41B 7/04 |
| | | | | 124/22 |
| 2015/0260478 A1 * | 9/2015 | Park | ............ | F41B 7/003 |
| | | | | 124/20.3 |
| 2018/0007887 A1 * | 1/2018 | Mclean | ............ | A01L 11/00 |

* cited by examiner

SPEARGUN HANDLE

FIELD OF ART

The invention relates to the field of weapon construction and more particularly to weapons which do not use an explosive propellant and even more particularly to weapons using a rubber or compressed air to launch a spear.

BACKGROUND OF THE INVENTION

The speargun handle disclosed in the present invention with its particular form and features has not been disclosed in the prior art.

Speargun is a type of weapon used in underwater fishing and which launches a spear. It usually consists of five parts: the handle with the trigger, the main tube, the muzzle, the launching means, which may be a spring, a rubber band or compressed air, and the spear. Spearguns, as understood, can be distinguished in three types, the spring-powered, the rubber-powered, functioning by the sudden expansion of a spring or a rubber band, and the pneumatic or air-powered ones. All three types of spearguns are loaded by the user's muscular power. Their construction materials vary according to their use and are usually steel, aluminum, and carbon fibre. Over the years, spring-powered spearguns have been replaced mainly by rubber-powered and airguns, as the latter two species prove to be more effective.

Both air- and rubber-powered spearguns put on the market also present a number of disadvantages and shortcomings, which often make them obsolete and make users to replace them. Given that the length of spearguns differs depending on the use, the user must also use the corresponding weapon. For hunting in cloudy waters, a small-sized weapon is sufficient, while for blue water hunting there are weapons with a length of 1.5 metres. With such weapons, the diver can hit large amberjacks or even bigger bluefin tunas. Frequently, however, divers use inappropriate weapons for the type of fish they hunt, which results in the weapons' receiving larger loads than the appropriate ones and breaking in the middle. The most common weak point is the trigger guard, i.e. the middle part of the speargun handle, where the trigger chamber is located.

A further drawback of the spearguns used so far is the trigger mechanism as there are two types, the normal mechanism and the so-called reverse one. They are determined depending on where the shaft retaining hook and the trigger lever are located. In normal mechanisms, the retaining hook is located on the front of the trigger mechanism and the lever is on the rear side, the opposite occurring in the reverse mechanism. As a result of the above, the reverse mechanisms are advantageous as regards the active shaft loading length, as the shaft can load 5-10 cm rearward of the normal type, increasing the dynamic energy of the rubber and thus the shaft energy in launching. But both mechanisms in their classical form to date have the retaining hook and the trigger lever inside a cover, the so-called 'cartridge", resulting in the overall size of the trigger mechanism being particularly large and thus, in the handle size's increasing. A large-sized weapon is not always desirable as it hinders the diver's movements and poses a risk of damage in narrow passages between rocks. Furthermore, the current solutions present reduced strength and use more assembling pieces, increasing the potential for damage to some of them. Finally, the assembly time of such a mechanism is very long.

Still a downside of the weapons available on the market is that many of them cause frictions in the movement of the shaft, which reduces its speed as well as its proper shooting, causing difficulties to divers. Additionally, they prevent water from entering the original portion of the weapon barrel, resulting in greater recoil during shots, further reducing the proper shooting.

An additional disadvantage is the presence of weapons that do not drain the water completely after use, resulting in rapid corrosion of some parts and the need to replace them, with the respective financial costs for the users.

A further disadvantage of the currently available reverse mechanism handles, which have a horizontal internal mechanical line holder behind the shaft hook, is that this is either fixedly mounted on the one side of the handle or even if side change can be carried out, the change may be carried out only by dismounting the trigger mechanism from the handle body, to gain access to the line holder.

Still a shortcoming of the spearguns currently available on the market is mainly the construction of their handle, directed to the right-handed users, who make up the majority. As a result of this design, many of the speargun fittings, such as the line holder, the safety or even the end through which the diver holds the handle, are not ambidextrous, making it more difficult for left-handed users to operate the weapon.

It is an object of the present invention to advantageously overcome the aforementioned disadvantages and shortcomings of the prior art by proposing a speargun handle with particular and innovative technical features.

It is a further object of the present invention to provide a speargun whose handle has a particularly low anatomical profile such that the shaft launched substantially represents a continuation of the user's forearm. Also, the low profile contributes greatly to reduced recoil when pointing at by means of index finger rather than by eye, and to the weapon's agility.

It is a further object of the present invention to provide a speargun having a handle which has increased static and special strength for its ideal and appropriate dimensions, receiving the loads during use thanks to its particularly reinforced guard and generally the whole of the handle.

An additional feature of the speargun of the invention is the presence of a longitudinal hole in the handle of the gun, which is intended for increasing hydroplane and reducing the friction when launching the shaft and for the water's entering the inner chamber of the handle, thereby reducing the recoil and achieving more straightforward shots and at the same time complete water drainage when cleaning the gun so that there is no risk of corrosion of its parts.

It is a further object of the invention to provide a speargun handle having deflectors in a parallel and not in an angled shape for the lines, on either side thereof, so as not to get tangled with the shaft and the bands. An additional feature is that they do not protrude from the lateral line of the barrel and therefore there is no risk of breaking or jamming the lines.

Another advantageous feature of the invention is that a shock absorber can be fitted onto the speargun handle and internally of the barrel in a threaded manner at the front of the handle attached to the tubular barrel, in a female or male fashion thereby converting the tubular weapon into a weapon that can handle shafts with a larger mass or a greater number of bands for hunting bigger game.

A further feature of the invention is that it has chambers at the speargun handle base's member, allowing the user to add weight or positive buoyancy materials to regulate the total weight of the weapon and adjust it to the individual user's hand.

A further advantage of the invention is the presence of an anatomical trigger chamber, which leads the user's index to press at the right place thereof. Further, it has a trigger stop at a significant distance from its axis of rotation, resulting in the trigger movement terminating at the appropriate place. Finally, the presence of indentations at the back of the trigger from the protrusion designed to terminate the stroke from the shaft hook, reduces its weight without reducing its strength which would result in its deformation or rupture.

An additional advantage of the handle of the present invention is that the internal horizontal mechanical line holder that moves directly from the rear part of the shaft hook and is located at the rear of the trigger mechanism has a visible screwing point at the top of the handle. Since the rotation axis of the line holder is not stabilized in the mechanism by any simple or security type nut, also rotatable or not, inside the mechanism or on the line holder bore but it is stabilized internally in the handle body, this means that the user has the option of changing the line holder side, depending on where it is best served, by simply unscrewing the respective screw without requiring complete disassembly of the trigger mechanism.

An additional special feature of the speargun handle of the invention is that it has a reverse trigger mechanism, with the trigger lever outside the mechanism cartridge, resulting in an even more compact construction.

These and other objects, features and advantages of the invention will become apparent in the following detailed description.

BRIEF DESCRIPTION OF THE DRAWINGS

The invention will become apparent to those skilled in the art with reference to the accompanying drawings, in which it is illustrated in an exemplary but not limitative manner.

FIG. 5 is a perspective view of the speargun handle of the invention, while

DETAILED DESCRIPTION OF PREFERRED EMBODIMENTS

Referring now to the accompanying figures, we will describe illustrative embodiments of the speargun handle of the present invention in order to illustrate its particular technical characteristics.

Figure 1:
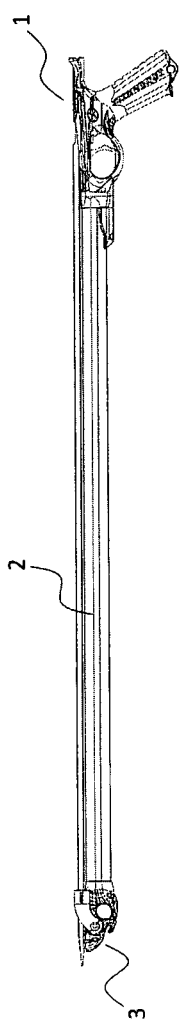
FIG. 1 shows a perspective illustration of the speargun of the present invention.
Figure 2:
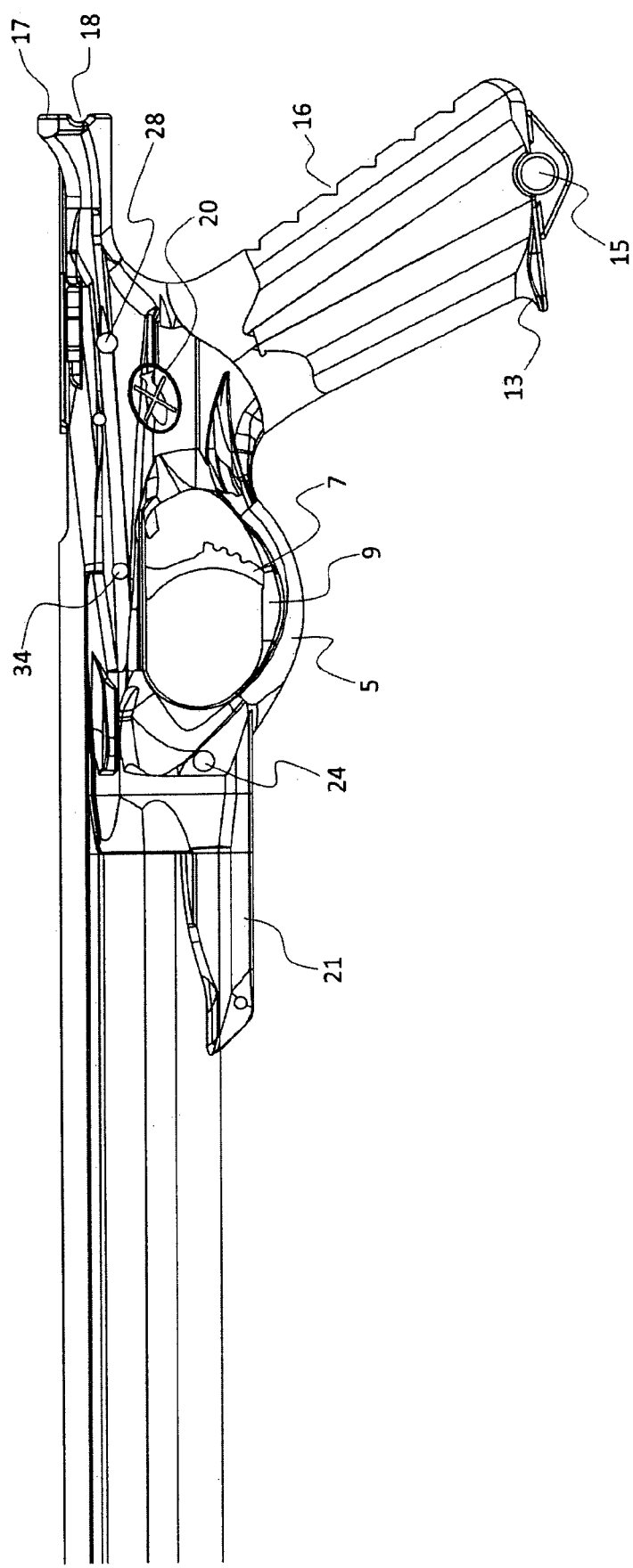
FIG. 2 shows in detail, a perspective illustration of the handle and part of the gun tube.
Figure 3:
FIG. 3 shows in plan view an illustration of the speargun using the handle of the invention, while, respectively.
Figure 5:
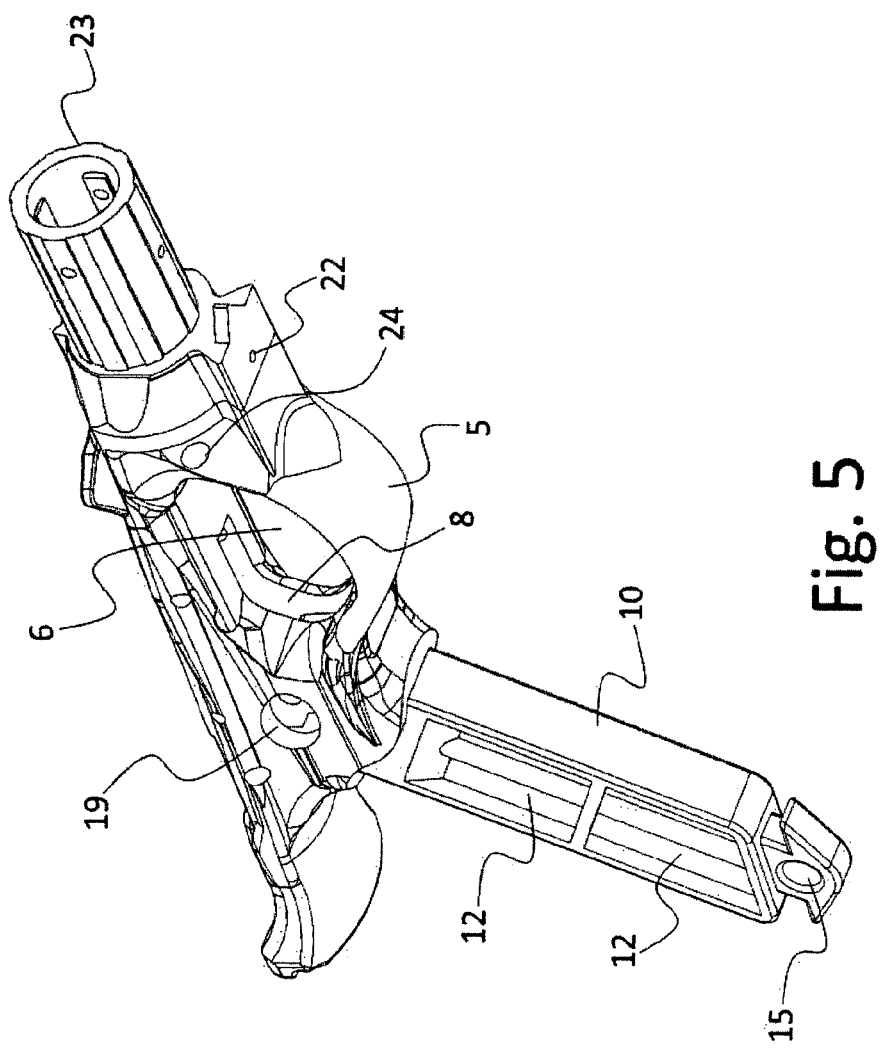
Figure 6:
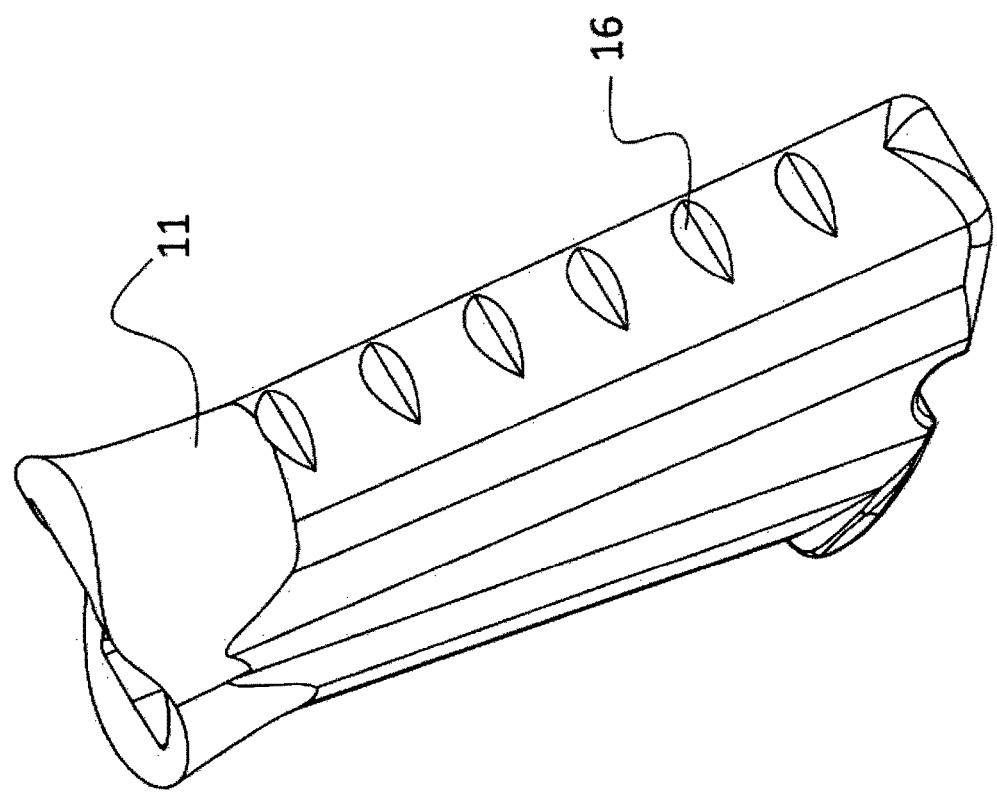
FIG. 6 shows the anti-skid cover of the handle in three-dimensional illustration.
Figure 7:
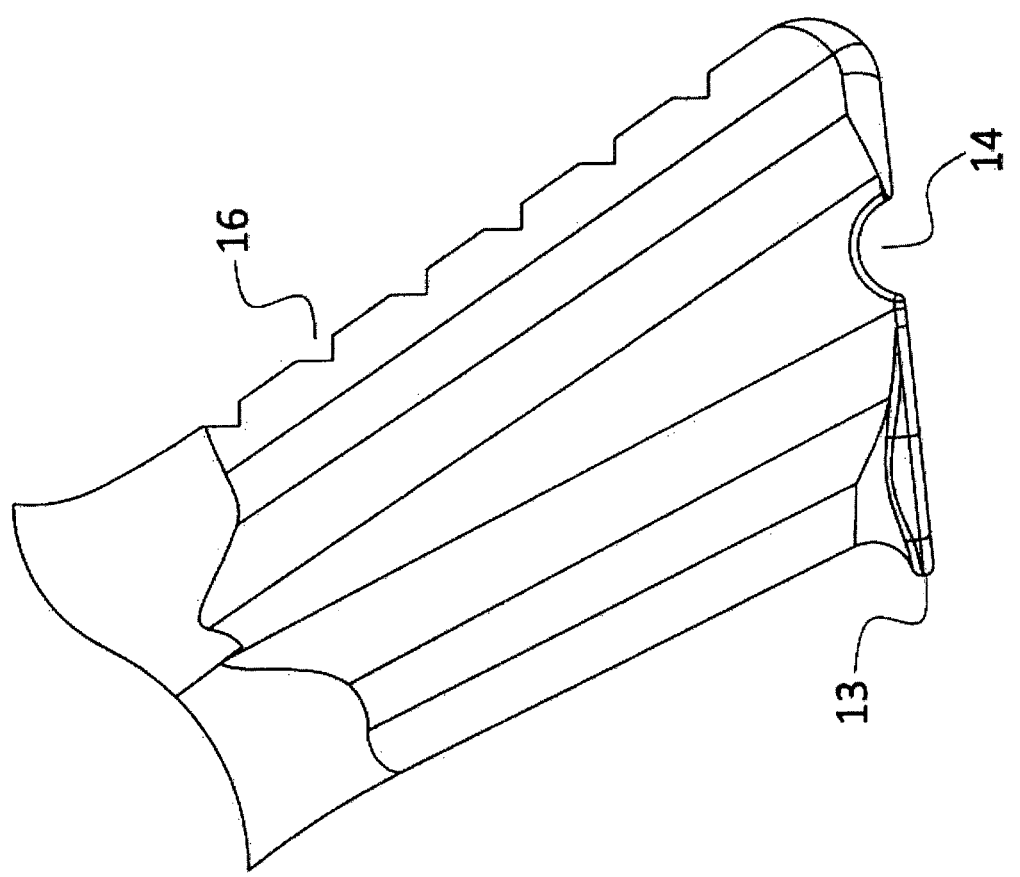
FIG. 7 is a perspective view of the cover that is attached to the speargun handle.

Each speargun, FIG. 1, consists of the handle (1), the tube (2) and the muzzle (3). The shaft (4), FIG. 3, is positioned along the tube (2) and is launched using rubbers not shown here. The handle (1), FIG. 2, has a trigger guard (5) which is an integral part thereof and which is reinforced so as to be able to receive a large part of the loads which are generated during loading and launching the shaft (4). This effectively addresses one of the most important drawbacks of spearguns, which often led to cracks and breaking of the weapon in the middle of the handle due to the generated tensions. The guard (5) creates a chamber (6), FIG. 5, in which the trigger lever (7) is located. The chamber (6) is anatomically designed, helping to properly exert pressure on the trigger lever (7), while having a groove (8) in which the lever (7) moves and a flat base (9) which acts as a stop in its movement. Further, the handle (1) has a retaining member (10), to which the non-slip retaining cover (11), FIG. 6, is applied by which the user holds the speargun. The retaining member (10) is an integral part of the handle (1) and comprises chambers (12) on either side. Chambers (12) are used to add weight or positive buoyancy material to make the speargun heavier or lighter for the user, suitably meeting its requirements. The retaining cover (11) is removable, preferably made of elastomeric materials, so that covers with different slopes or various anatomical, ambidextrous, right-handed, left-handed shapes can be used to better serve a user. The retaining cover (11) may be provided at its base with an extended end (13), FIG. 7, which acts as a terminal point for the user's small finger while retaining the gun. It further has a notch (14) so that the through hole (15) of the retaining member (10) is fully visible through which the user can fasten the handle (1), using a clip or other suitable means. Finally, the ribs (16) further assist in properly retaining the gun.

The rear side of the handle (1) terminates on a loading aid (17) which may be detachable on the handle body (1) or an integral part thereof. The loading aid (17) increases the surface in loading, so that the handle (1) is fastened better to the diver's body when loading. For this reason, there is a longitudinal groove (18), in which the diver's wetsuit neoprene is enclosed, when loading, thus retaining the gun more effectively in the desirable position.

Figure 14:
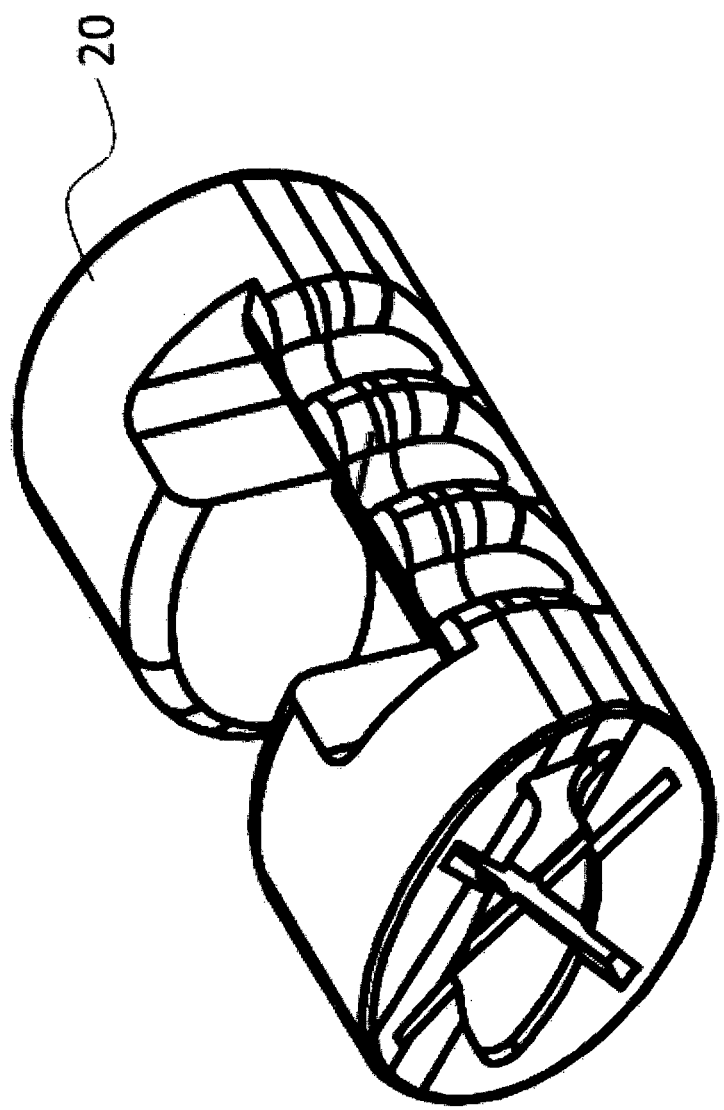
FIG. 14 illustrates the discharge safety of the invention speargun trigger

Further, the handle (1) has a through bore (19) to which the discharge safety (20), FIG. 14, fits to prevent unexpected and undesirable use of the gun. The discharge safety (20) may alternatively be located at the base of the guard (5), or anywhere else in the guard chamber (6), preventing the trigger lever (7) to move when fitted on the gun.

Figure 8:
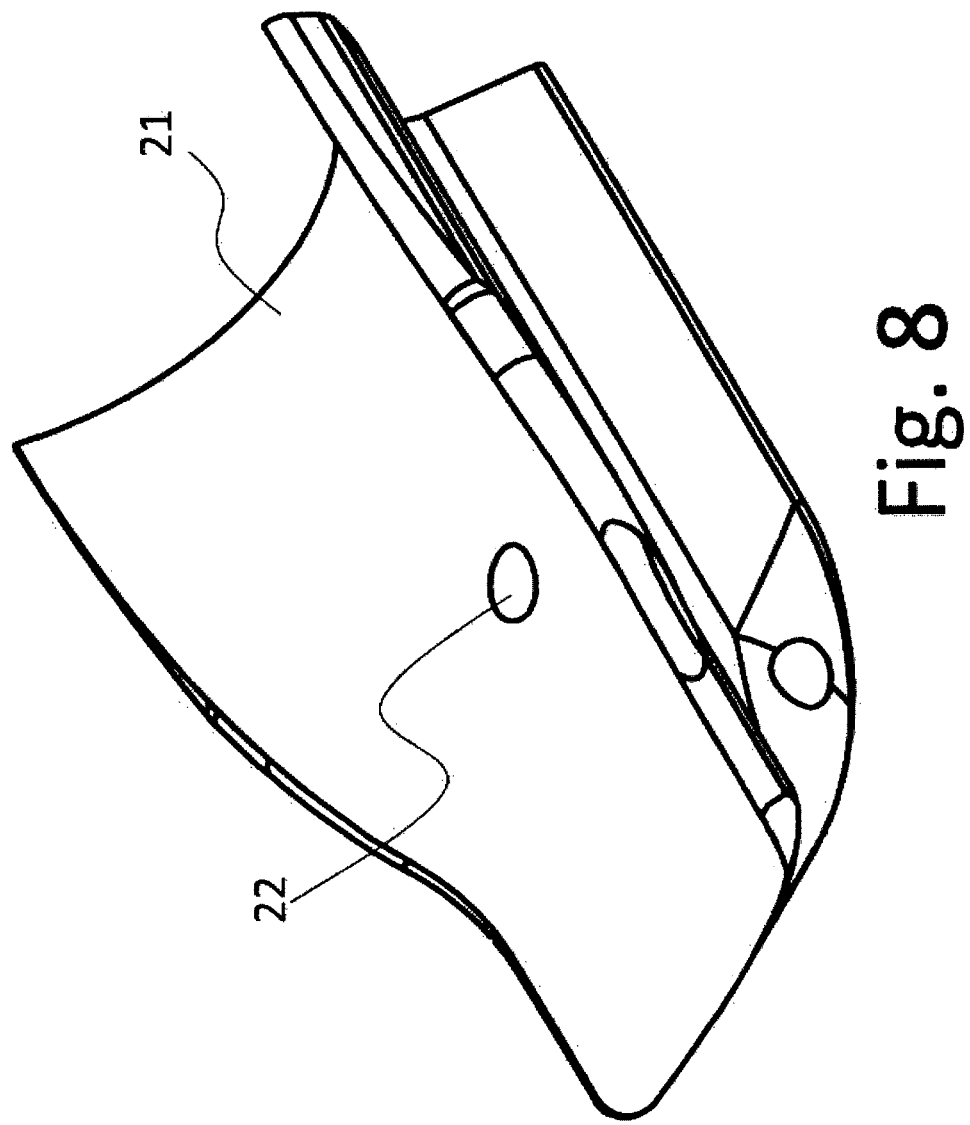
FIG. 8 shows the reel base located on the underside of the handle.

At the front of the handle (1) there is a reel base (21), FIG. 8, with a hole (22), for screwing the desirable reel on the handle. The speargun of the invention may accept reels that may be attached to the base, both vertically and horizontally. The front end (23) of the handle (1) can accommodate any type of tube (2) of a corresponding diameter. In front of the guard (5), the gun has a through bore (24), with multiple utilities, depending on the user. Therein, a camera base for underwater shooting can be fitted or alternatively a base for rubbers on spearguns with rollers, known as roller type. Furthermore, a system for hunting larger game, such as tuna, can be fitted. At the upper part of the handle (1) two horizontal deflectors (25), FIG. 2, acting as guides for the lines so as not to tangle with the tube (2) and the rubbers, project on either side. To date, these deflectors are in the centre of the lateral portion of the handle and protrude enough to achieve their purpose, resulting in dyskinesia and often in breaking or entangling of line lengths when arranging them around the barrel.

Figure 4:
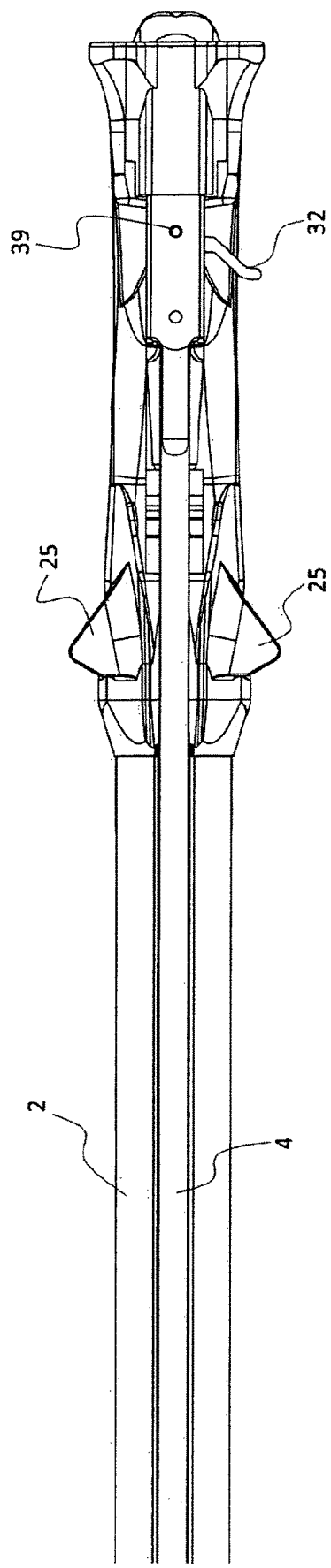
FIG. 4 shows in detail the plan view of the handle.
Figure 9:
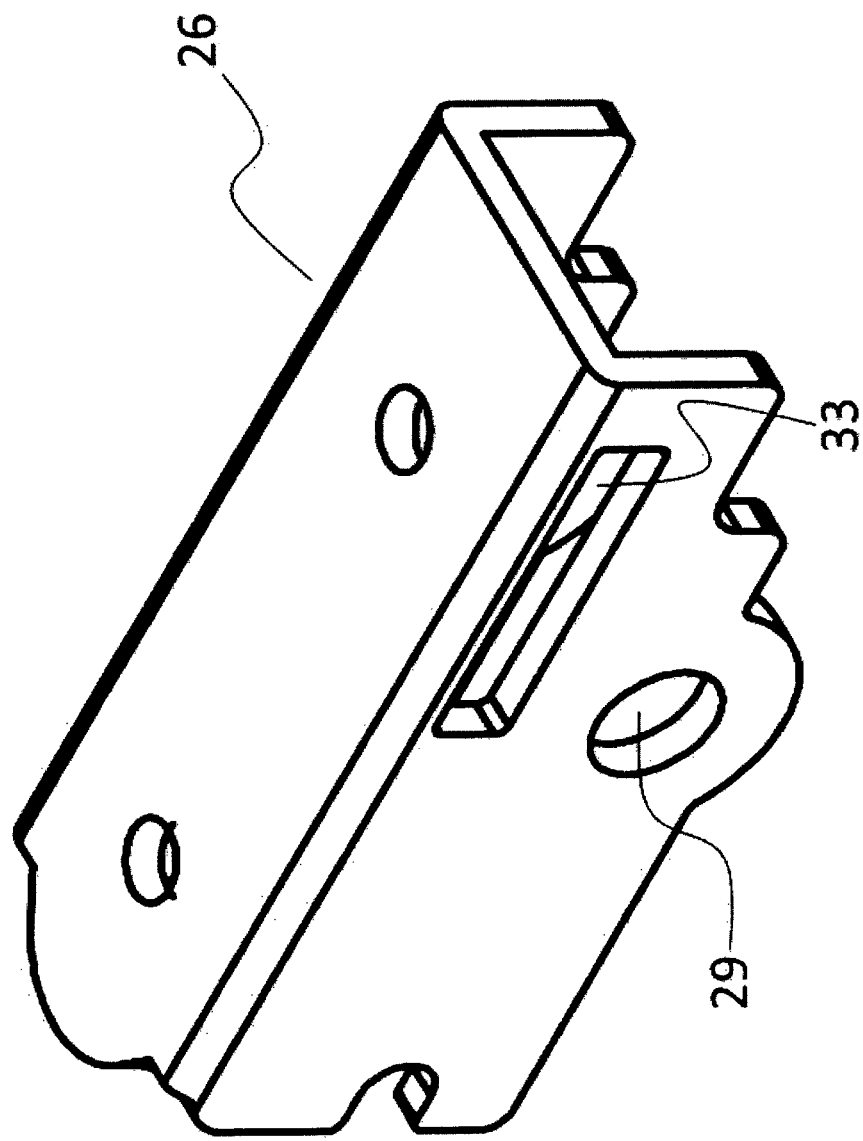
FIG. 9 shows the trigger mechanism cover and FIG. 10 shows the trigger with its indentations to reduce its weight.
Figure 12:
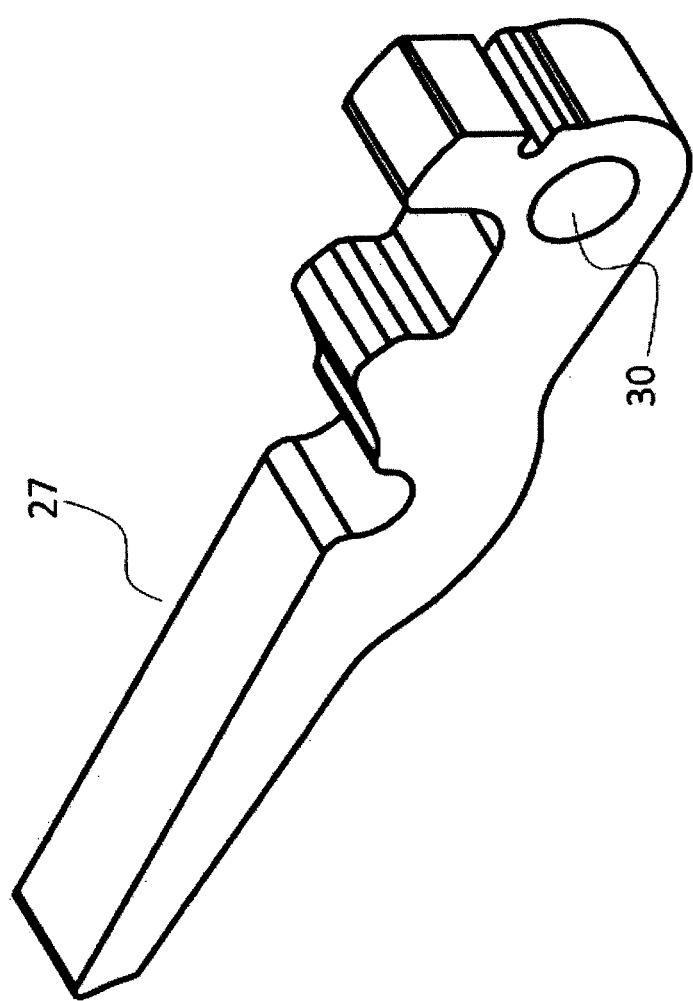
FIG. 12 illustrates, in a three-dimensional representation, the trigger lever retaining hook.
Figure 13:
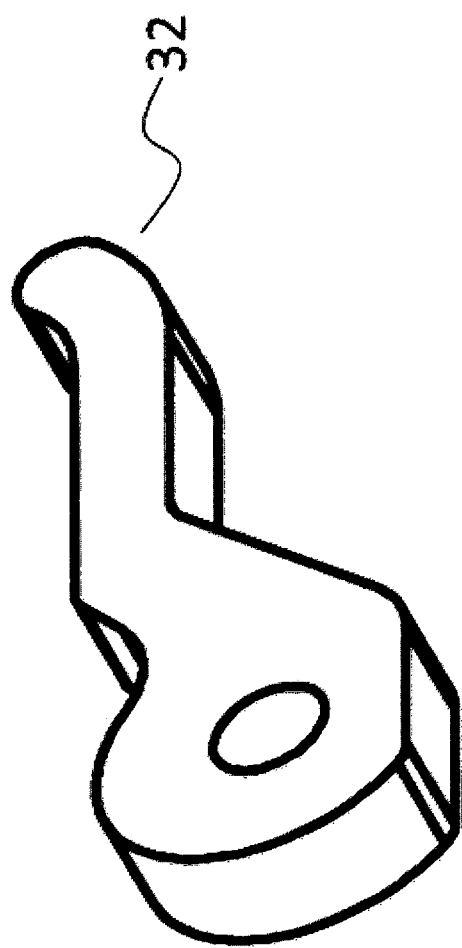
FIG. 13 shows a prospective, illustrative sketch of the line holder used in the invention trigger mechanism.

The speargun handle of the invention has a reverse type trigger mechanism, but with a very significant innovation. The trigger mechanism consists of a cover, referred to as cartridge (26), FIG. 9, on which the lever retaining the shaft tail (4) abuts the cartridge roof (26). This lever is called retaining hook (27), FIG. 12, and is held by a pin passing through the hole (28) of the handle (1), the holes (29) on the sides of the cartridge (26) and the hole (30) of the retaining hook (27). The design is such that the pin retaining the hook (27) on the cartridge (26) acts as a fulcrum and the forces required to release the shaft (4) are much lower than those exerted on the shaft (4) by the rubbers. When loading the shaft (4), the retaining hook (27) comes in a position parallel to the base of the cartridge (26), so that the boss (31), FIG. 11 thereof, is not visible from the through bore (19). This allows the use of the discharge safety device (20). In loading, the line holder (32), FIG. 13, which moves along the groove (33) of the cartridge (26) and which is screwed onto the handle body from the cartridge by a screw (39), is immobilized by the retaining hook (27). The line holder (32) helps maintain the lines stretched, preventing them from becoming entangled in general. Upon launching the shaft (4), and dropping the retaining hook (27), it is also released accordingly. It is obvious that the line holder (32) may be both right and left of the cartridge (26), and may further be parallel to the roof thereof, as shown in FIG. 4, or perpendicular thereto. An important advantage of the line holder (32) is that because the screw (39) is visible and screwed onto the handle body and not somewhere else, the user is enabled to change side by simply unscrewing the screw (39) without requiring disassembly of the trigger mechanism.

Figure 10:
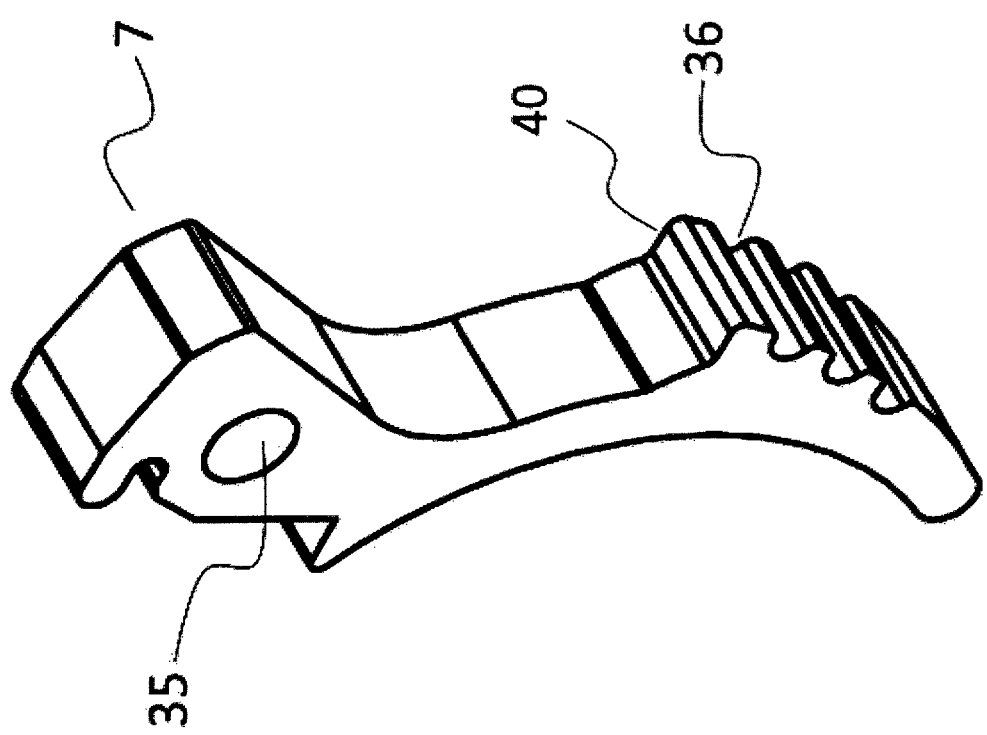
Figure 11:
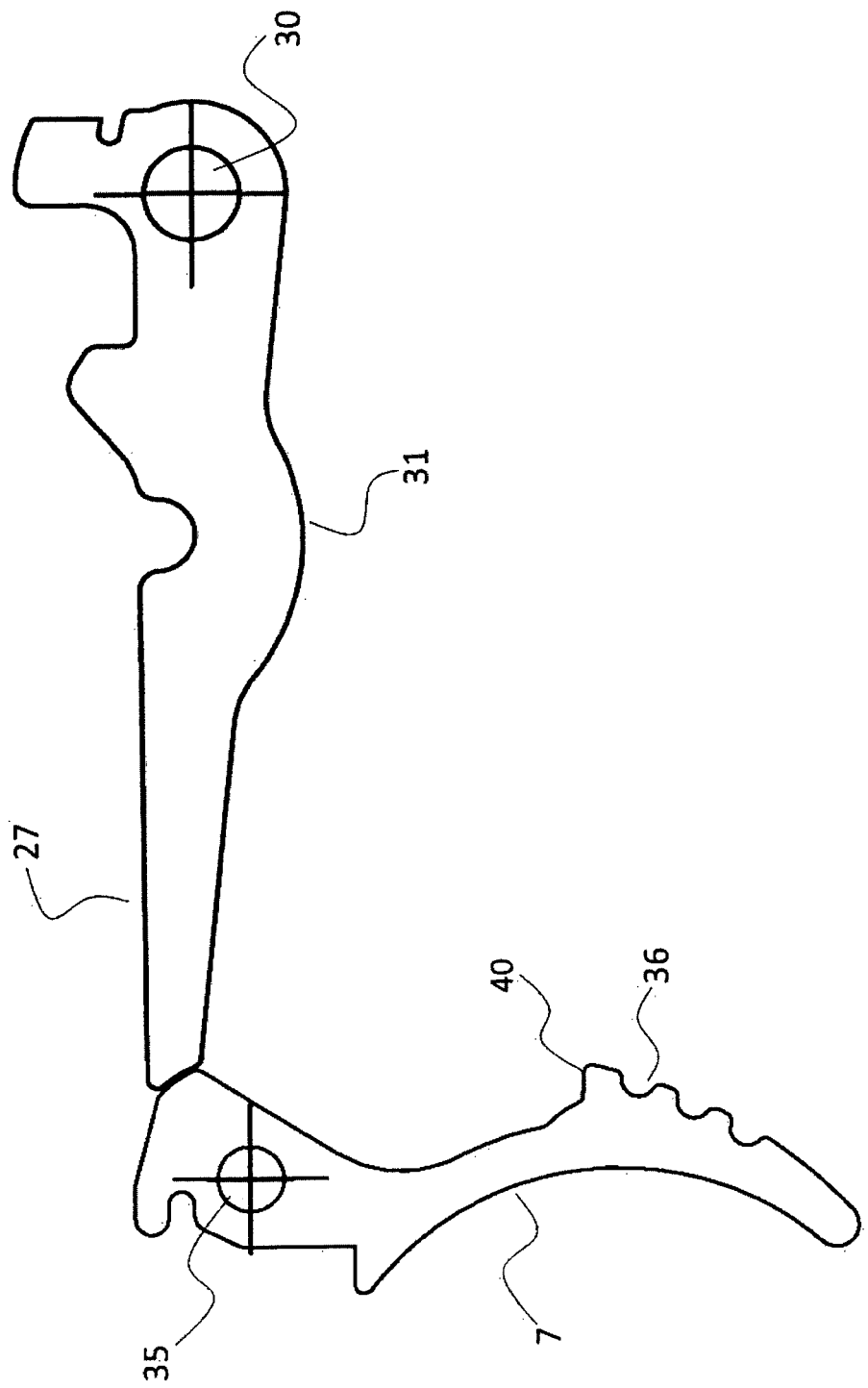
FIG. 11 is a perspective view of the trigger lever and the retaining hook thereof.

The trigger lever (7), FIG. 10, is located on the front of the cartridge (26) and outside it. The trigger lever (7) is retained on the handle (1) thanks to a pin passing through the hole (34) of the handle (1) and the hole (35) of the trigger lever (7). A spring that is twisted around the pin allows the trigger lever (7) to reset. As shown in FIG. 11, the retaining hook (27) is prevented from moving due to being blocked by the upper part of the trigger lever (7). If the lever is pressed the hook can move and release the shaft (4). Since the trigger lever (7) is now out of the cartridge (26), the height of the entire trigger mechanism is much lower, while decreasing the length and height of the cartridge (26), optimizing the strength of the handle body (1) between the cartridge (26) and the trigger lever (7) without increasing the external dimensions, reducing the size, the overall parts of the mechanism and its mounting time. A further feature of the trigger lever (7) is the presence of indentations (36) at the rear of the trigger to the projection (40) designed to terminate the travel of the retaining hook (27), reducing its weight without reducing its strength which would lead to its distortion or breakage.

Figure 15:
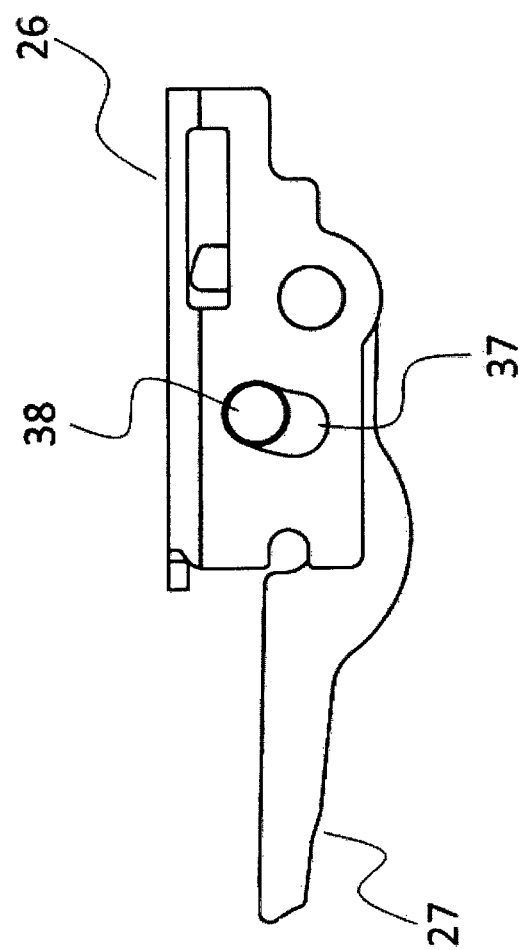
FIG. 15 shows an alternative embodiment of the trigger mechanism used in the speargun handle.
Figure 16:
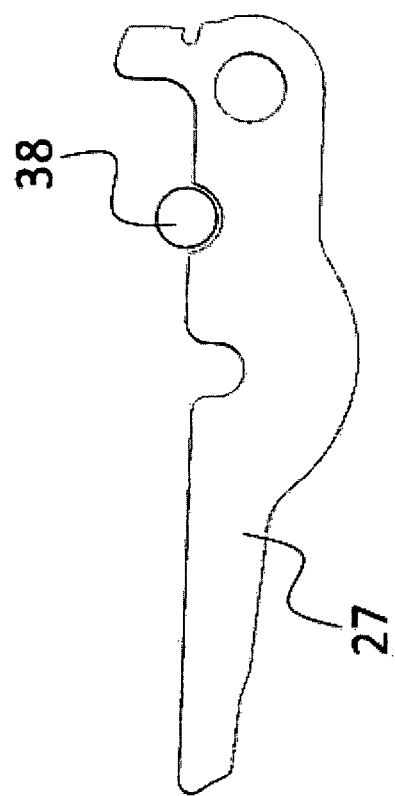
FIG. 16 illustrates in perspective view the retaining hook used in the alternative mechanism of FIG. 15.

In an alternative embodiment of the invention, the trigger mechanism has a different design with respect to the cartridge (26) and the retaining hook (27). The cartridge (26) has an oval hole (37), FIG. 15, in which a pivot pin (38) rests and moves. The retaining hook (27), FIG. 16, in this case has a slot in which the pivot pin (38) abuts. When the trigger mechanism is loaded, as in FIG. 15, the pivot pin (38) is engaged in the upper side of the oval bore (37) and the recess of the retaining hook (27), whereas when the shaft (4) is launched, the retaining hook moves downward, creating the necessary space for the pivot pin (38) to move toward the lower side of the oval bore (37) of the cartridge (26). In loading, the pin is therefore essentially seated on three points in the oval holes (37) of the cartridge (26) and in the recess of the retaining hook (27). The presence of this pivot pin (38) is particularly important as the developing stresses upon launching the shaft (4) are received by the pin and are distributed both in the cartridge (26) and the retaining hook (27), in contrast with the hitherto available mechanisms having a pin or roller in the engagement where all the developing forces are exerted on the shaft hook and from there are transferred to the trigger lever embedded in the cartridge. At this point, it is noted that the pivot pin (38) may have different shapes or dimensions, such as smaller diameter ends with a shoulder, blocking it inside the cartridge (26), or may be perforated, consisting of two parts, the perforated part abutting the retaining hook (27) of the shaft and the other part passing through and abutting the cartridge walls (26).

The construction of the handle (1) is such that it is ambidextrous, since both the retaining member (10), the discharge safety device (20), the deflectors (25) and the line holder (32) may operate both for right-handed and left-handed divers and the handle (1) of the gun can be made wholly or partly of any kind of plastic, aluminum, carbon fibre or any other suitable material.

It is worth mentioning that this particular mechanism, as a simple construction, does not fall short at all in relation to more complicated constructions, which in order to achieve certain levels in good and safe operation, usability, durability, longevity, consist of more pieces increasing the chances of damaging one of them, as well as the time of construction, assembly and total cost in general.

It is to be noted here that the description of the invention has been made by reference to exemplary embodiments, not limited thereto. Therefore, any change or alteration in anything concerning the shape, dimensions, morphology, scope, materials used and the components of construction and assembly unless they constitute a new inventive step and do not contribute to the technical development of the already known are considered to be contained to the objects and contemplation of the present invention.

The invention claimed is:

1. A speargun handle (1), comprising:
a guard (5), which creates a chamber (6) for a trigger lever (7);
a retention member (10) with chambers (12), surrounded by a non-slip retaining cover (11);
a loading aid (17), with a longitudinal groove (18), positioned along a rear end of the handle;
a front end (23) to which a tube (2) is securable for launching a shaft (4);
line deflectors (25) positioned along an upper part of the handle; and
a trigger mechanism secured within the handle and having a cartridge (26), a retaining hook (27), and a line holder (32) secured within the cartridge by a screw (39) through a top of the cartridge (26),
wherein the retaining hook is secured within the cartridge and longitudinally extends forward toward the front end and beyond the cartridge, and
wherein the trigger lever (7) is located outside and in front of the cartridge (26), is held on the handle (1) by a pin passing through the hole (34), and, when the shaft (4) is loaded, prevents the retaining hook (27) from freely moving.

2. The speargun handle (1) according to claim 1, wherein the trigger lever (7) has indentations (36) up to a projection (40), terminating the retaining hook (27) to reduce a total weight thereof.

3. The speargun handle (1) according to claim 1, wherein the chamber (6) has a groove (8) in which the trigger lever (7) and a flat base (9) move, which acts as a stop in movement of the trigger lever (7).

4. The speargun handle (1) according to claim 1, wherein the screw (39) can be unscrewed from the top of the cartridge (26) without disassembling the trigger mechanism.

5. The speargun handle (1) according to claim 1, wherein the cartridge (26) is provided on either side with two oval holes (37), and a pivot pin (38) is engaged between the two oval holes and the recess of the retaining hook (27) during loading to receive and distribute developing stresses during launching, of the shaft (4), on both the cartridge (26) and the retaining hook (27).

\* \* \* \* \*